United States Patent
Demsey et al.

(10) Patent No.: US 10,779,021 B1
(45) Date of Patent: Sep. 15, 2020

(54) VIDEO AD DELIVERY AND VERIFICATION

(71) Applicant: Konduit.me Inc., Wilmington, DE (US)

(72) Inventors: Seth Mitchell Demsey, Vienna, VA (US); Michael Irvin Hyman, Bellevue, WA (US); Alexander Alexandrovych Kislitsyn, Kharkov (UA); Andrew Petroka, Baltimore, DE (US)

(73) Assignee: Konduit.me Inc., Wilmington, DE (US)

( * ) Notice: Subject to any disclaimer, the term of this patent is extended or adjusted under 35 U.S.C. 154(b) by 0 days.

(21) Appl. No.: 16/850,341

(22) Filed: Apr. 16, 2020

Related U.S. Application Data

(63) Continuation-in-part of application No. 16/395,561, filed on Apr. 26, 2019, now Pat. No. 10,694,226.

(60) Provisional application No. 62/836,834, filed on Apr. 22, 2019, provisional application No. 62/836,802, filed on Apr. 22, 2019.

(51) Int. Cl.
| | |
|---|---|
| *H04N 21/234* | (2011.01) |
| *H04N 21/24* | (2011.01) |
| *H04N 21/242* | (2011.01) |
| *H04N 21/858* | (2011.01) |
| *H04N 21/81* | (2011.01) |

(52) U.S. Cl.
CPC ..... *H04N 21/23424* (2013.01); *H04N 21/242* (2013.01); *H04N 21/2407* (2013.01); *H04N 21/812* (2013.01); *H04N 21/858* (2013.01)

(58) Field of Classification Search
CPC .............................................. H04N 21/23424
See application file for complete search history.

(56) References Cited

U.S. PATENT DOCUMENTS

| | | | |
|---|---|---|---|
| 9,865,005 B1* | 1/2018 | Pottjegort | ............... G06Q 30/02 |
| 9,973,830 B1* | 5/2018 | Shetty | ............... H04N 21/23439 |
| 2013/0268963 A1 | 10/2013 | Nugent et al. | |
| 2013/0311309 A1 | 11/2013 | Napchi et al. | |
| 2016/0198238 A1 | 7/2016 | Hajuyev et al. | |
| 2016/0295277 A1* | 10/2016 | Sankaran | ........... H04N 21/4431 |
| 2016/0345074 A1 | 11/2016 | Serbest et al. | |
| 2017/0034591 A1* | 2/2017 | Ray | ..................... G06Q 30/0269 |

OTHER PUBLICATIONS

Interactive Advertising Bureau, Video Player-Ad Interface Definition (VPAID) Version 2.0, Released Apr. 10, 2012, total of 58 pages.
Interactive Advertising Bureau, Video Ad Serving Template (VAST) Version 3.0, Published, Jul. 19, 2012, 71 total pages.
Interactive Advertising Bureau, Video Ad Serving Template (VAST) Version 4.0, Released Jan. 21, 2016, Corrections and clarifications (Section 7) added Apr. 2016, 74 total pages.
Interactive Advertising Bureau, Digital Video Ad Serving Template (VAST) Version 2.0, Released Nov. 11, 2009, 16 total pages.

* cited by examiner

*Primary Examiner* — Michael H Hong
(74) *Attorney, Agent, or Firm* — SoCal IP Law Group LLP; Angelo Gaz; Steven C. Sereboff

(57) ABSTRACT

There are disclosed devices, system and methods for video ad delivery. The disclosed platform optimizes video advertisements, such as VAST and VPAID content, that is delivered to end users through video players. An optimization server may run video ads in a sandbox environment which mimics a real environment and runs video ads within the sandbox environment to produce verification of playback which is unavailable in the real environment.

20 Claims, 9 Drawing Sheets

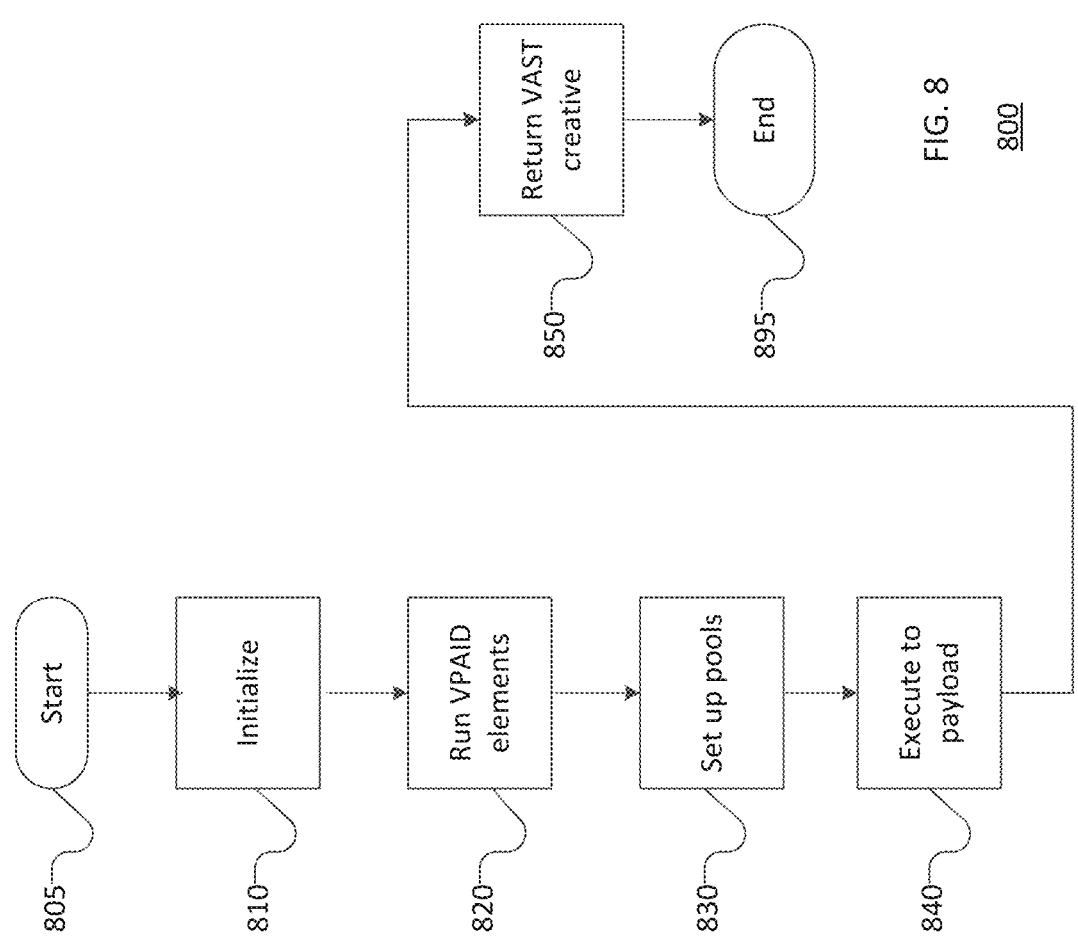

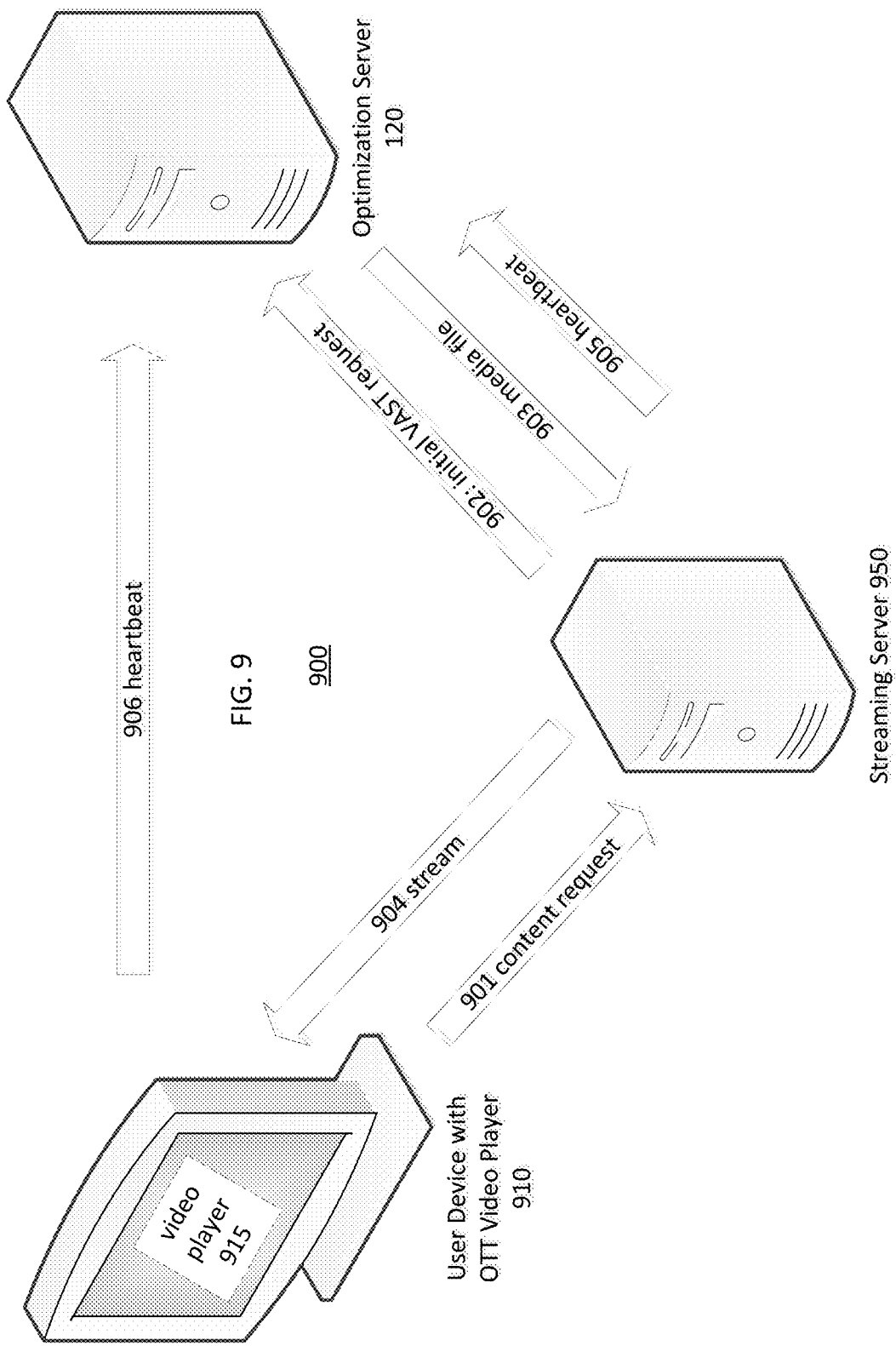

VIDEO AD DELIVERY AND VERIFICATION

RELATED APPLICATION INFORMATION

This patent claims priority from Provisional Application No. 62/836,802 filed Apr. 22, 2019 entitled Enabling Measurement on Server-Side-Stitched Video Ad Insertion, and is a continuation-in-part of application Ser. No. 16/395,561 filed Apr. 26, 2019 entitled Video Ad Delivery.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to delivery of video ads.

Description of the Related Art

The basic video ad delivery process involves a call and response mechanism. When a video player, running on a desktop PC, must display an ad, it typically requests or calls up the necessary ad data from ad servers. The ad servers respond by sending the data corresponding to the video ad to the video player. The number of ad servers involved can vary. A video player may pull data directly from ad servers, such as one controlled by an ad publisher. Alternatively, the video player may call up an agency or network ad server that then redirects the video player to secondary ad servers which supply the needed information.

An ad server is software and hardware that is used to deliver digital advertising creatives, manage ad campaigns, store creatives (i.e., an object that contains all the data for visually rendering the ad itself), store data about advertising content, and deliver ads to websites and applications. Ad servers are available as hosted services or as self-hosted products. Ad servers are typically used by publishers, networks and advertisers to help with ad management, campaign management and ad trafficking. An ad server also provides reporting on ads served on websites. First-party ad servers allow publishers to manage inventory (ad space/placements) on their websites, display ads sold via direct deals with advertisers, sell remnant (unsold) inventory to ad networks, ad exchanges, and supply-side platforms (SSPs), and report on ad performance. Third-party ad servers are used by advertisers to store their ads, measure campaign performance across several publishers, and verify metrics against reports from publishers, such as impressions and clicks.

An ad network is a technology platform that serves as a broker between a group of publishers and a group of advertisers. In ad networks, media buyers manually make campaign changes for targeting and optimization. Like an ad network, an SSP automates and optimizes the selling of online media space. Ad networks typically provide advertisers with controlled access to exclusive and premium publishers. SSPs, on the other hand, typically offer real-time bidding for advertisers and publishers, dynamically matching them. SSPs typically use programmatic technologies to optimize on behalf of publishers.

Ad mediation is a technology that sends ad requests to multiple SSPs or ad networks to ensure publishers find the best available network to fill their ad slots. First, publishers rank ad networks in order of preference. Second, the mediation platform tries the top ad network. The mediation may be based on maximizing revenue from filling the ad slots.

A video player is a software application on a user device which plays both video content and video advertising on the user device. The video may be streamed or on-demand from a remote source such as an ad server. Some video players run on general purpose computing devices (e.g., PCs and smart phones) and others run on special-purpose devices (e.g., set-top boxes). Most contemporary web browsers are compatible with embedded video players, as do many mobile apps, though a video player may be stand-alone application software.

A video player will play videos at the request of the user, but ads are different from user-requested videos and other content because ads are played before, during or after user-requested videos at the behest of an advertiser, rather than the user. Indeed, users sometimes prefer to avoid ads. By definition an ad is content which is played automatically in conjunction with content that the user requests and with the purpose of promoting a brand, service, product or other activity that may or may not be related to the video the user requested to see. When a video player receives an instruction to play an ad (i.e., typically when the player detects an ad opportunity before, during, or after playback of a video), the ad tag will identify an ad server from which to fetch the ad to play, known as the primary ad server. However, an ad requested to the primary ad server may be dynamically redirected to a secondary ad server. The secondary ad server is used by an SSP, an ad network or by the buyer of ads to serve creative, track results and optimize creatives.

An ad tag is a code snippet or URL that invokes an ad server to search for an ad. An ad tag is created and placed for each ad placement. When a player loads, the player calls whatever ad tags are configured for its placements. The ad tag gives instructions (i.e., an ad request) to the player to retrieve the ad from a specified ad server. Although ad tags may take many forms, such as JavaScript or URLs, for video ads ad tags are usually URLs that are invoked and that will return an ad to execute that conforms to the Video Ad Serving Template (VAST) standard. An ad tag may include VAST parameters, and the VAST specification includes several that may be included in a VAST tag: VMaxd—maximum duration of video accepted, in seconds; VPl—video player frameworks accepted; VHt—expected height of video in pixels; VWd—expected width of video in pixels; VBw—maximum bandwidth of video requested in bits per second; and Vstrm—stream type, 0 for progressive, 1 for streaming.

A video ad has at least two components, making up an ad unit—a media file or code file having the advertiser's creative, and metadata which describes the media file and how it should be played. The video ad could also return a secondary ad tag to call, causing a chained call from one ad request to another.

The VAST is a standard XML-based ad response template for in-stream video as well as an XML Schema Definition (XSD) for developers. VAST was designed for use with video players that parse the ad response prior to playing the ad. As of March 2020, the most recent VAST release is version 4.2. VAST provides a common protocol that enables ad servers to use a single ad response format across multiple publishers and video players. A key to VAST is that the video player can process scripts. VAST supports linear video ads, non-linear video ads and companion ads.

The VAST schema provides a request-response protocol. The video player requests an ad from an ad server, and the ad server responds. The response from the ad server is typically either a single ad in VAST format, a set of ads (ad pod), no ad, or a VAST response that contains a nested VAST response or code for making chained ad server requests.

The VAST specification defines the response to be in the following format:
    <VAST version="4.0">
    <Ad>
        <!--ad details go here-->
    </Ad>
    </VAST>

Linear digital video ads are played during an interruption in streaming video content, much like a TV commercial. They can play before (pre-roll), during (mid-roll), or after (post-roll) the streaming content. Linear ads may be skippable.

Nonlinear video ads are typically served as images or code content that "overlay" the video content. The nonlinear video ad runs concurrently with the video content so the user sees the ad while also viewing the video content without interruption. The nonlinear video ad is typically small enough to allow a relatively unobstructed view of the video content. Nonlinear video ads can be delivered as text, static images, interactive rich media, or as video overlays.

An ad pod is a sequenced group of ads.

Companion ads are ads that are served along with linear or nonlinear ads in the form of text, static image display ads, or rich media. These ads come in a number of sizes and shapes and typically run alongside the video player. The primary purpose of the companion ad is to offer sustained visibility of the sponsor throughout the streaming video experience. Digital video companion ads are always served with a master ad, which is either the linear or nonlinear ad.

A wrapper ad is a VAST document that points to another VAST document from a different server. When a wrapper ad is requested, the primary ad server is still the first server to receive the request. However, the primary ad server responds with a VAST XML document with a wrapper ad including the impression uniform resource identifier (URI, in some cases also known as a URL), other tracking URIs, and click tracking URIs to be requested by the video player, along with the ad tag to the secondary ad server from which the video ad will be served. In some cases, the URI includes or is a uniform resource locator (URL). The wrapper specifies that the video player should request the ad tag from the secondary ad server. The secondary ad server then responds with the VAST document containing an inline ad, or alternatively can respond with a VAST document containing a second wrapper ad. This wrapping process can continue to any depth. The wrapper can go to another VAST or can invoke a secondary auction, which is an ad that contains script that calls additional ad servers. This script follows standards such as VAST 4.x/JavaScript or Video Player Ad Interface Definition (VPAID), and effectively invokes an ad player within the video player. VPAID ad units are typically are configured with ad tags that then return additional VASTs, which sometimes include additional VPAID ad units. Potentially there could be additional sets of URIs as in the case where an ad network redirects to an agency ad server.

VAST does not significantly change the prior request and response mechanism for ad video delivery. Rather, VAST adds more control, and also allows an ad tag to be delivered to a video player with a generic target instead of a URI for the video ad, with an ad server selecting the specific video ad to be played on demand and then providing the video ads URI to the video player. The typical sequence of VAST ad requests from the video player is as follows:

1. The video player on the user device processes an ad tag and makes a request to the primary ad server. The primary ad server returns a VAST tag. The player parses the VAST tag.

2. If the VAST tag is empty or invalid, the player does not play an ad.3. If the VAST tag contains a nested ad tag, the player continues to call and process VASTs until receiving an empty or invalid VAST or until receiving a VAST with a video ad to show.

4. If the VAST tag returns a video ad in VPAID format, it executes the code associated with the VPAID ad. This can either play an ad or can call additional ad tags, which restart the process of step 1.

5. With each chained secondary ad server the overall size of data transferred will increase and latency will increase.

6. The video player retrieves and plays the video ads specified in the XML response(s). The video player will also request tracking URIs which triggers reporting of impressions (i.e., displays of ads), such as to a publisher, ad server and/or SSP. As used herein, a video player by definition has the functionality to process VAST tags and automatically play video ads according to the VAST tags.

The VAST specification defines a number of additional terms. A video ad measurement guideline (VAMG) outlines how events should be tracked. The VPAID establishes the communication protocol between an interactive ad and the video player that is rendering it. A video multi ads playlist (VMAP) enables a structure for a playlist of video ads sent from an ad server to a video player.

Accordingly, when VAST is used, the video player will perform numerous request-response exchanges. Each of these exchanges creates some latency, uses bandwidth, and burdens the video player's device with far more processing than pre-VAST environments where the video player requested a specific ad and then received and played it. VPAID execution is particularly burdensome, since VPAID ads often load large code files and use a lot of processing power. As a result, sometimes ads that are specified do not run properly, and ad tracking can suffer. These problems become more severe with mobile computing devices, thinner computing devices, and as advertisers seek to exploit more of the opportunities for advertising and tracking/reporting that VAST allows. The result is that the user experience can degrade considerably, and advertisers and publishers can lose opportunities and revenue.

Desktop ad execution typically has several parts: a request to the primary ad server from the user's browser via the player; execution of client-side auctions (often nested) each of which performs its own pre-bid evaluation of viewability, fraud and device characteristics; execution of VPAID pre-ad checks, and then finally the execution of the ad itself, which may or may not be a rich creative.

VPAID and other scripting mechanism typically are not supported by the video players used in over-the top media services (OTT), or in server side ad insertion (SSAI) and dynamic ad insertion (DAI) environments. OTT, also known as connected TV (CTV), generally refers to content providers that distribute streaming media as a standalone product directly to proprietary video players of their customers over the Internet, bypassing telecommunications, multichannel television, and broadcast television platforms that traditionally act as a controller or distributor of such content. Most subscription-based video on demand services are OTT, such as Amazon Video, Hulu, Netflix and Sling TV.

The lack of VPAID support by OTT dramatically reduces the amount of ads that can run on OTT, as well as tracking and analytics. Verification services verify the validity of the traffic, the viewability of the ad during playback, the actual playback of the ad, and potentially brand safety. OTT generally does not enable the execution of JavaScript measurement capabilities that are required for many ad buyers. The methods used in the VPAID ad standard require the client to execute JavaScript to do this. In the case of SSAI/DAI ads, this does not happen because only the stream goes to the client and the OTT video player has no ability to fire pixels or execute measurement script. Some vendors will fire pixels based upon stream position. This works well only when the vendor controls the stream and has direct information about the ad (that is, the ad is directly hosted without any wrapping technology and is not delivered from a programmatic ad server). As a result, the stream vendor may elect to not measure ads, the stream vendor restricts what ads they can use, or an advertiser elects not to use the channel for advertising. More modern versions of VAST, including the current VAST 4.2 specification, also enable vendor-specific JavaScript to be executed client-side to do measurement and traffic validation (IVT). However, many OTT video players do not support script execution. This, in effect, significantly discourages use of advertising in OTT through ad networks and retail-time bidded ads.

DESCRIPTION OF THE DRAWINGS

FIG. 8 is a flowchart of processing a VPAID ad unit.

FIG. 9 is a general system block diagram of an OTT environment showing data flows.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

The disclosed platform optimizes video advertisements, specifically VAST and VPAID content that is delivered to end users through video players. Benefits may include improved (increased) ad start rate, reduced ad start time (latency), and increased measured viewability (which is a function of time, among other things). Increased viewability may lead to increased ad price and advertiser performance as well.

Figure 1:
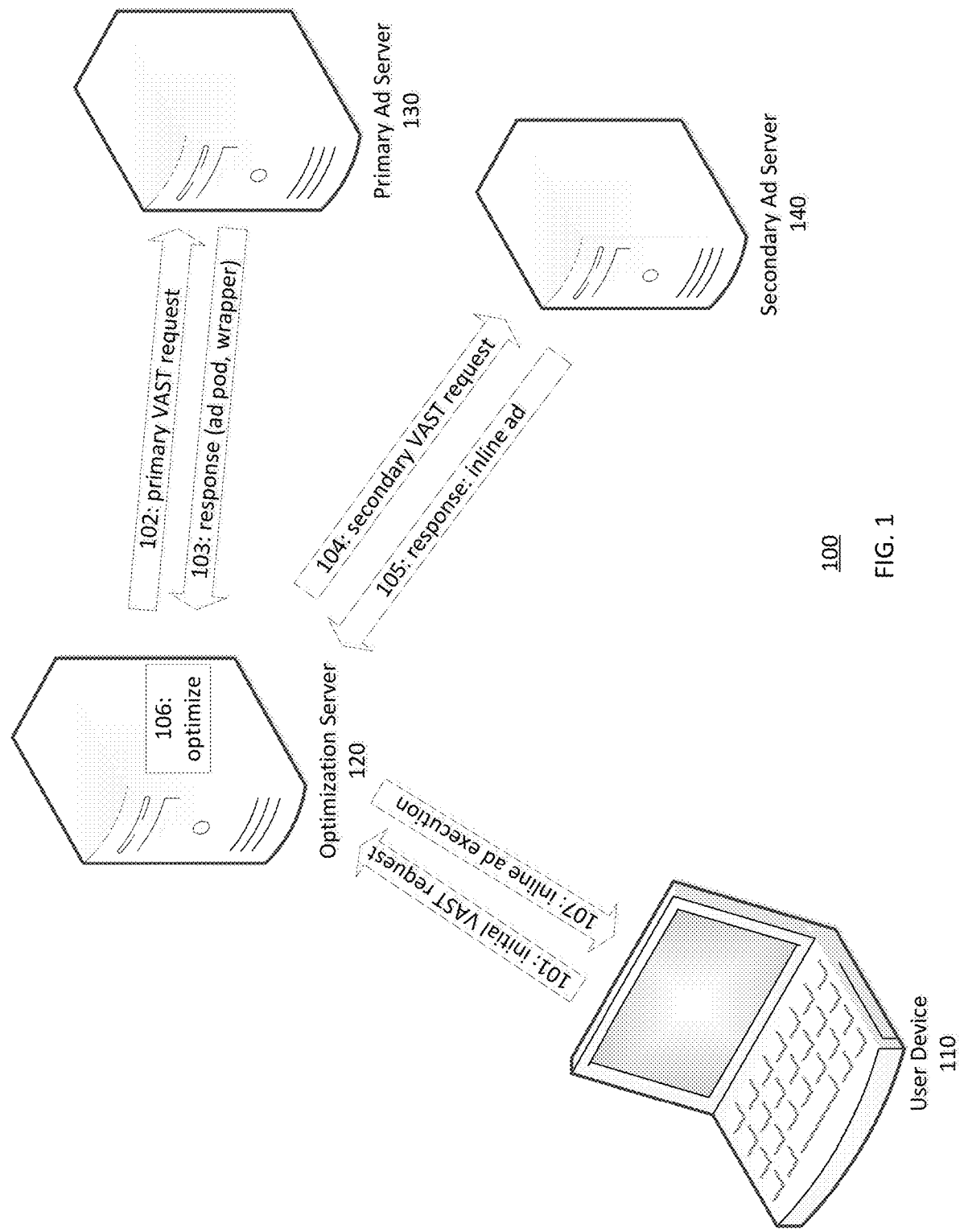
FIG. 1 is a general system block diagram of a video delivery environment.

Referring now to FIG. 1 there is shown a general block diagram of a system 100 for serving digital video advertisements (ads). The system includes a user device 110, an optimization server 120, a primary ad server 130 and a secondary ad server 140. These devices 110, 120, 130, 140 communicate via digital data networks (not shown), such as the Internet, local area networks (LANs), and/or private data networks.

The user device 110 is a computing device which includes a human user interface. The user device 110 may be, for example, a desktop personal computer (PC), laptop or other personal computer, a tablet, a smartphone or other mobile device, a set top box or a video game system. The user device 110 includes a video player (not shown) and a data network interface for accessing the network.

The optimization server 120, the primary ad server 130 and the secondary ad server 140 are servers. The primary ad server 130 and the secondary ad server 140 are ad servers.

FIG. 1 also shows a general flow of processing in the system 100, represented by flows 101, 102, 103, 105, 105, 106 and 107.

In flow 101, an initial VAST request is sent from the user device's video player to the optimization server 120. The initial VAST request includes an initial VAST URI as a parameter. Flow 101 may alternatively be from a server instead of the user device 110.

In flow 102, the optimization server 120 performs the VAST request on behalf of the video player, by sending a primary VAST request to the primary ad server 130. Performing acts on behalf of the video player (or emulating the player) is when the optimization server 120 performs acts instead of the video player performing those acts. As represented by flow 103, the primary ad server 130 provides a VAST response to the VAST request of flow 102. The primary VAST response may be an ad pod or a wrapper. In such case, in flow 104 the optimization server 120 sends additional VAST requests (e.g., a secondary VAST request) to additional ad servers (e.g., the secondary ad server 140) as specified in the ad pod or wrapper. In flow 105 the additional ad servers (e.g., the secondary server 140) provide respective responses, which include for each a respective inline ad. The optimization server 120 continues to unwrap (e.g., parse or unpack) the initial VAST tag until it gets to the final inline VAST in response.

With all the VAST content available, in flow 106 the optimization server 120 can make certain decisions as to optimizing the VAST content. For example, where the response of an ad pod would normally return multiple ads, the optimization server 120 optimizes the multiple ads into a single ad. In flow 107, the optimization server 120 sends the optimized VAST tag back to the user device's video player.

Figure 2:
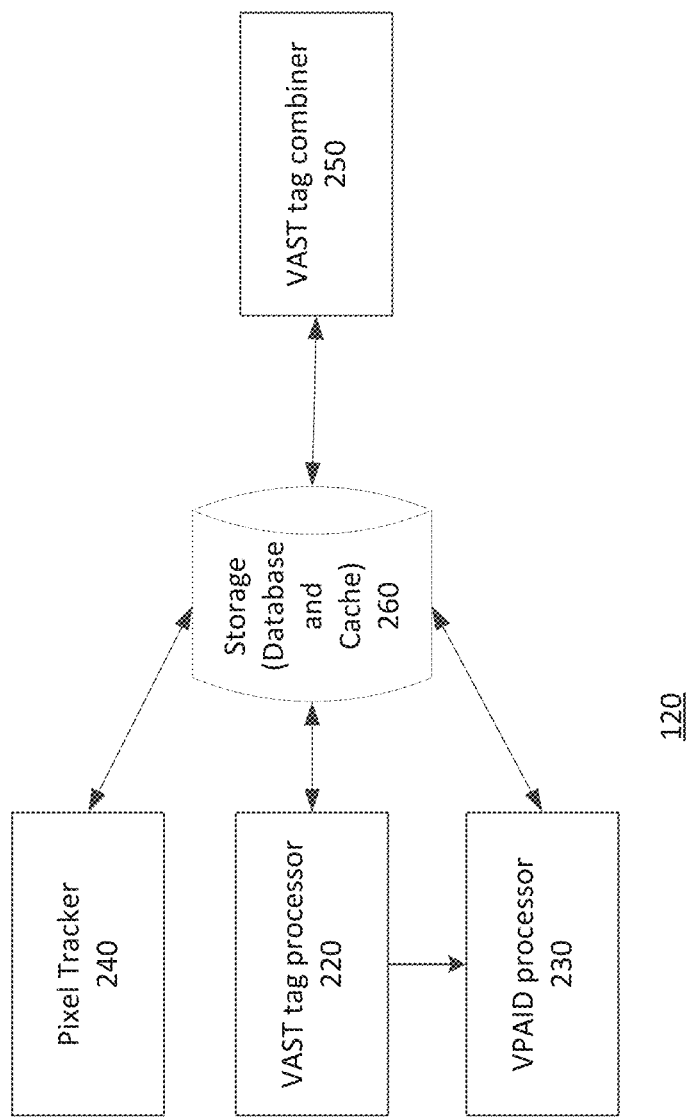
FIG. 2 is a system block diagram showing details of an optimization server.

Referring now to FIG. 2 there is shown another view of the system 100 showing details of the optimization server 120. The optimization server 120 includes services including a VAST tag processor 220, a VPAID processor 230, a pixel tracker 240, a VAST tag combiner 250 and a memory 260. The services may represent software running on a processor.

The VAST tag processor 220 reads the VAST tag in the initial VAST request (e.g., see flow 101), and any VAST tags (e.g., see flows 103 and 105) received by the VAST tag processor 220 in response to processing the initial VAST tag and makes a decision as to how to process the VAST tags.

For a VAST tag with a VPAID ad unit, the VAST tag processor 220 calls the VPAID processor 230 to process the VPAID ad unit.

The VPAID processor 230 may be a separate service apart from the VAST tag processor 220 and the pixel tracker 240, and may be used independently of these other services 220, 240. The VPAID processor 230 can execute VAST tags in a sandbox environment, collecting metrics while running the tag. This service 230 extracts valuable information as to what is going on inside of a VPAID ad unit. The VPAID processor 230 can also produce a play-ready, non-interactive ad from a VPAID ad unit that specifies an interactive ad, while satisfying requirements of the VPAID ad unit for interactivity.

The pixel tracker 240 attends to tracking pixels that may be included in the unwrapped VAST wrapper tags, including Impression, TrackingEvents, VideoClicks, and Extensions. The pixel tracker 240 may identify tracking pixels suitable for combination, for example because they track the same thing.

At the end, the VAST tag combiner 250 combines the VAST tags (e.g., see flows 103 and 105) into a final, optimized VAST tag (e.g., see flow 107), and returns the optimized VAST tag back to the video player, such as of device 110. The VAST tag combiner 250 may order the sequence of the VAST tags in the optimized VAST tag so that whichever VAST tag loads quickest is first in the sequence. The VAST combiner may arrange the other VAST tags so that the load speed or video playback is optimized. The VAST combiner 250 may also combine all of the tracking pixels.

The optimized VAST tag might have optional custom pixels added that are used for A/B testing, error management, or other measurement. These pixels, triggered by the video player, are processed within the optimization server 120 by the pixel tracker 240.

The VAST tag processor 220, the VPAID processor 230, the VAST tag combiner 250 and the pixel tracker 240 store and retrieve data from the memory 260. The memory 260 provides a database and a cache for the optimization server 120.

Figure 3:
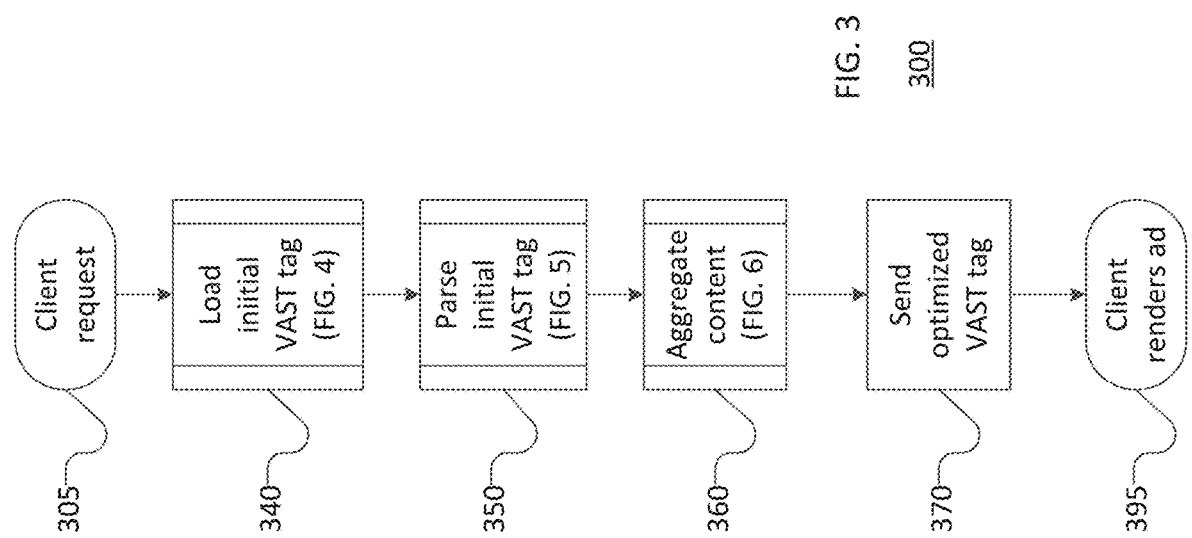
FIG. 3 is a flowchart of a process for serving digital video ads.

Referring now to FIG. 3 there is shown a flowchart of a process 300 for serving digital video ads. The flowchart has both a start 305 and an end 395, but the process is cyclical in nature. The process 300 may be implemented in the system 100. The process 300 may be performed by the optimization server 120. In the process 300, a video player (e.g., of device 110) sends a single initial VAST request (e.g., see flow 101) to an optimization server 120 and the optimization server responds with a single optimized VAST response (e.g., see flow 107). That is, after sending an initial VAST request to the optimization server, the video player does nothing with the initial VAST request until it receives the optimized VAST response from the optimization server. The optimized VAST response has one inline ad in which all of the ads implicated or specified in the initial VAST request are combined.

The process 300 begins 305 with an initial VAST request from a video player (client) being received by the optimization server. The initial VAST request (e.g., see flow 101) includes a VAST tag, which will be referred to as the initial VAST tag. The initial VAST tag includes one or more of an inline ad, an ad pod or a wrapper. The initial VAST request may include client characteristics and metadata information as parameters to the VAST URI.

The optimization server may be called to process the initial VAST request in a number of ways. For example, the initial VAST request may include a wrapper received by the video player from an SSP server in response to an ad request. In such case, the wrapper may specify the optimization server and may have been sent by the SSP server to the video player. As another example, the initial VAST request may include a VAST URI received by the video player from an ad server in response to an ad request. In such case, the VAST URI may specify the optimization server and may have been sent by the ad server to the video player.

Figure 4:
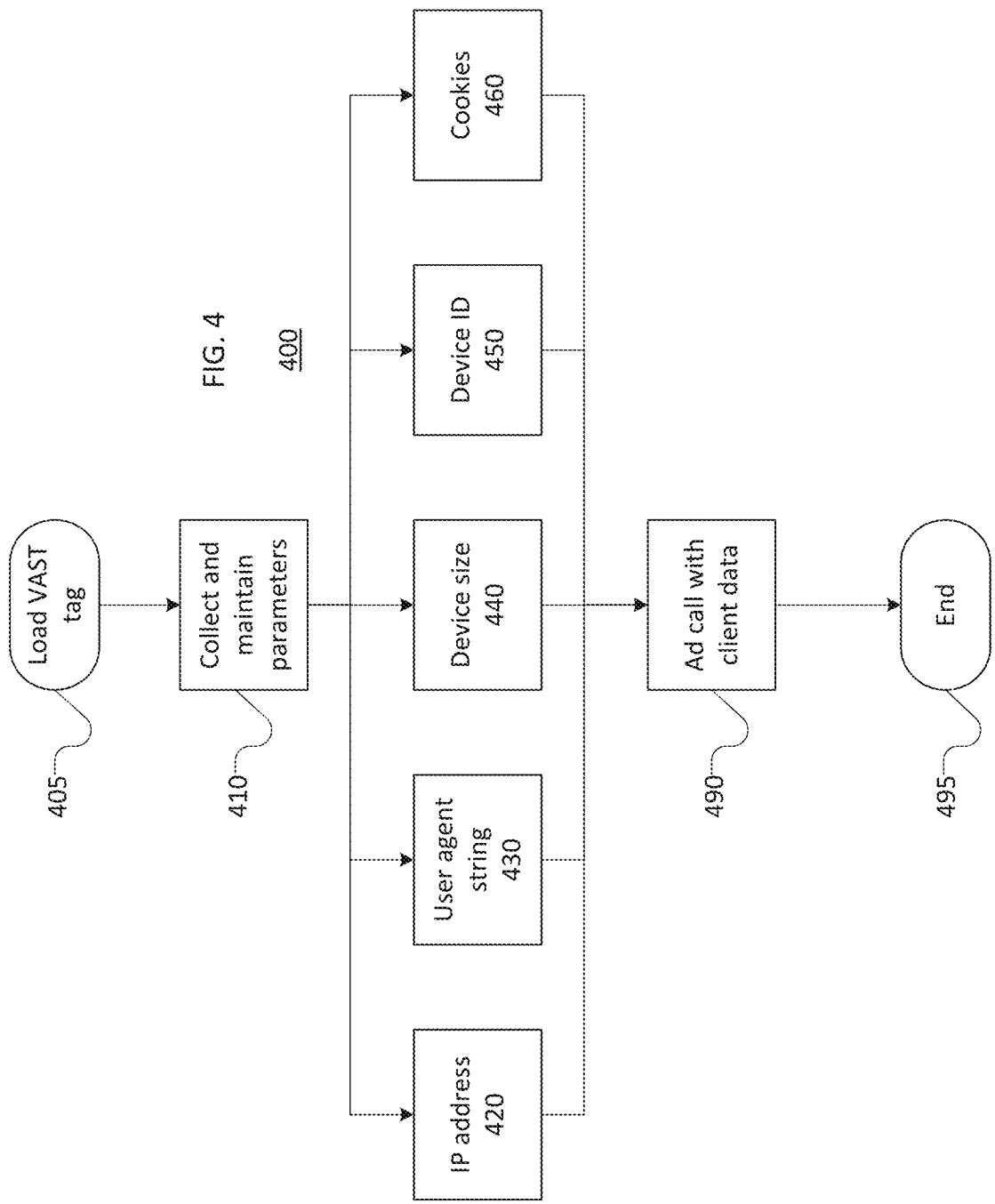
FIG. 4 is a flowchart of loading a VAST tag.

At the outset 340, an optimization server such as the optimization server 120 receives and loads the initial VAST request from the video player such as the video player of device 110. In this step 340, the optimization server loads the initial VAST request on behalf of the video player, including resolving URI macros and loading the initial VAST tag. Further details of step 340 are shown in FIG. 4.

Figure 5:
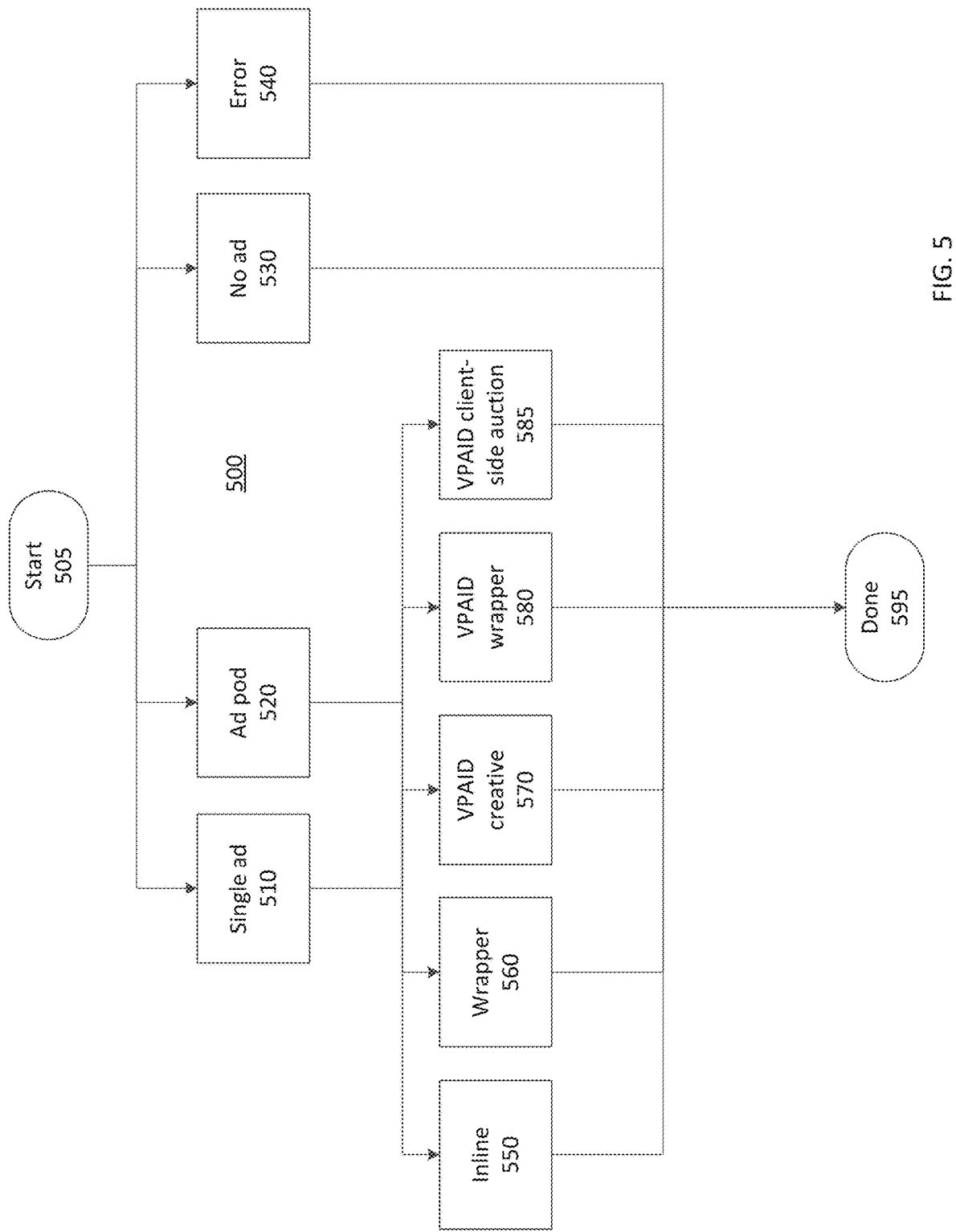
FIG. 5 is a flowchart of parsing a VAST tag.

Next, the optimization server parses and validates parameters in the initial VAST request on behalf of the video player 350. To accomplish this the optimization server unpacks the initial VAST tag as an emulation of or on behalf of the video player. The optimization server may check if a domain in the URI is blocked, and if so, then cause a redirect to a different URI. Further details of step 350 are shown in FIG. 5.

Figure 6:
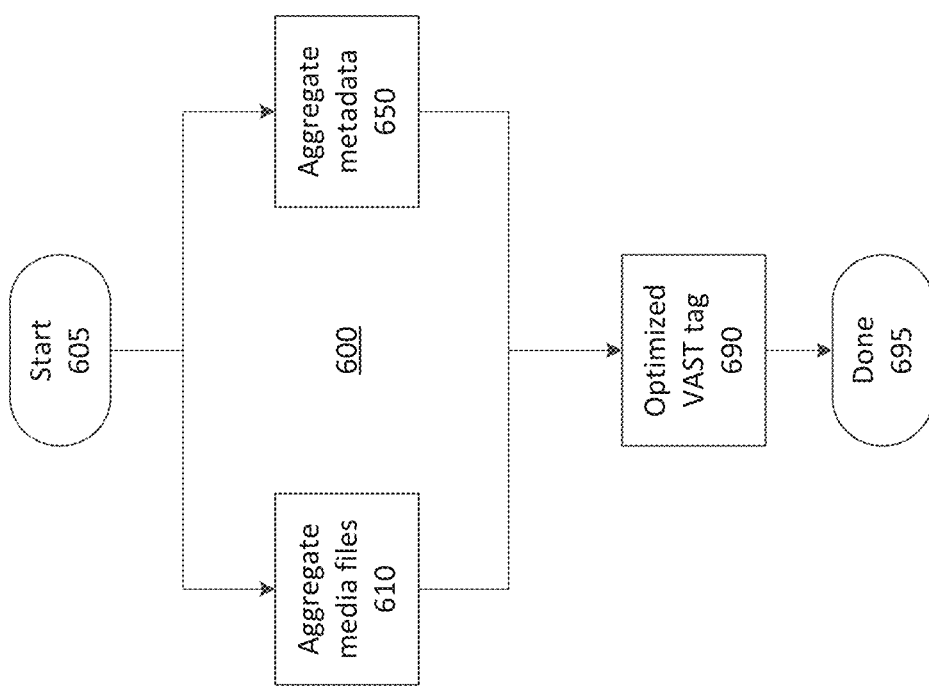
FIG. 6 is a flowchart of content aggregation.

Next 360, the optimization server creates an optimized VAST response. The optimized VAST (e.g., see flow 107) response includes a URI of a unified video ad for the video player, and without a redirect. The unified video ad incorporates all ads (e.g., see flows 103 and 105) specified in the initial VAST request. If the initial VAST tag is an ad pod, then the optimization server combines all child ads of the initial VAST tag into the unified video ad. If the initial VAST tag is as wrapper, then the optimization server unwraps all subsequent VAST wrappers, coalesces, and combines all wrapped ads of the initial VAST tag wrapped into the unified response including a video ad. Further details of step 360 are shown in FIG. 6.

The optimization server may monitor how much time it spends unpacking the initial VAST tag and creating the optimized VAST response. If too much time has passed (e.g., the amount of time exceeds a predetermined period of time), the optimization server may skip some processing specified in the initial VAST tag or subsequent VAST tags.

Next 370, the optimization server sends the optimized VAST response (e.g., see flow 107) to the video player. With the process 300 concluded 395, the video player can then render the unified ad.

Referring now to FIG. 4 there is shown a flowchart 400 of loading a VAST tag (e.g., see flow 101). The flowchart 400 starts at 405 which occurs after 305 and ends at 495 after which 350 occurs. The flowchart 400 may be performed by the optimization server 120, and more specifically by the VAST tag processor 230. After starting 405, the optimization server collects passed parameters from the VAST tag and maintains them 410. The passed parameters may be an IP address 420, a user agent string 430, a device size 440, a device ID 450, and/or cookies 460. Other parameters may be passed. This information may be received and preserved by the optimization server through standard x-forwarded or other appropriate protocols that allow for proper passing and preservation of these characteristics to the optimization server. These are the initial components necessary to provide a proper emulation using client (i.e., user) provided characteristics.

Next 490, the optimization server forms an ad call with the client data to the primary ad server.

Referring now to FIG. 5 there is shown a flowchart 500 of parsing initial VAST tags (e.g., see flow 101) to extract execution context of each ad to be played. The flowchart 500 starts at 505 which occurs after 340 and ends at 595 after which 360 occurs. The flowchart 500 may be performed by the optimization server 120, and more specifically by the VAST tag processor 230. The execution context is location information (e.g., a URI) for the media file of the ad and the corresponding metadata. The primary function of parsing by the optimization server is to execute all implicated or specified VAST tags until a media file is reached (e.g., obtained and/or created) the contains all of the specified media. By reaching the media file, the execution context is known. The execution context may be stored in a database of the optimization server.

If there is no ad 530 or if the initial VAST tag has an error 540, then no further parsing is needed, a "no ad" response may be returned, and the optimization server acts as an ordinary proxy.

The processing of a single ad 510 and an ad pod 520 is the same, except that with a single ad 510 there is only one initial VAST tag to process, and with an ad pod 520 there are multiple initial VAST tags to process. The optimization server will process the initial VAST tag differently depending on whether the initial VAST tag has an inline ad 550, a wrapper 560, a VPAID creative 570, a VPAID wrapper 580 or a VPAID client-side auction 585.

If the initial VAST response is an inline ad 550, then the optimization server can send an inline response as normal. In such case, the execution context of the media file is identified in the initial VAST tag, and that execution context is ready to be included in the optimized VAST response.

If the initial VAST response is a wrapper 560, then the wrapper is unwrapped, through all levels, to reach all endpoints and/or vendors. The unwrapped execution contexts are flattened, cached, and stored in the database for aggregation.

If the initial VAST response is a VPAID creative 570, the optimization server uses the execution context of the VPAID creative to prepare the optimized VAST response.

If the initial VAST response is a VPAID wrapper 580, the optimization server unwraps the VPAID wrapper and executes the corresponding page level script, akin to how an ordinary wrapper 560 is processed. Some VPAID wrappers are used to confirm whether a creative should execute, and in this case, the VPAID wrapper will continue operate that function via the code that is executed. Then, the optimization server executes the VPAID wrapper until all of the media files are reached.

If the initial VAST response is a VPAID client-side auction 585, then the optimization server calls the specified client-side auction (e.g., a specified SSP server runs an auction for the ad opportunity). The client-side auction then calls multiple ad vendors for an ad. The optimization server may monitor elapsed time and can shut down vendors and/or the entire auction if predefined timing thresholds are exceeded. When a winning ad is selected (i.e., the auction system reports a winning ad to the optimization server), the client-side auction performs its own checks and validations in its own environment which is captured in storage 260 of the winning ad within an isolated environment (e.g., a sandbox). The optimization server then executes the VAST tag of the winning ad until the media file is reached.

Another aspect of parsing is use of a cache. While processing single ads 510 and ad pods 520, the optimization server flattens and caches the respective execution contexts and other metadata which led the optimization server to the respective media files. When flattening occurs, the per wrapper, per tag variables are preserved and combined in an optimized way to enable an accelerated combined VAST response. By utilizing caching, collapsed VAST responses can be delivered faster than would be delivered without utilizing the cache, as a result of retrieving trackers, pixels, and variables that these additional wrappers, via the partners operating these wrappers, would have inserted. This reduces the frequency with which these services need to be called while maintaining their functionality. The optimization server also checks the cached for implicated execution contexts and uses cached versions where available. The caching may occur in memory 260, such as in a database stored in that memory.

Referring now to FIG. 6 there is shown a flowchart 600 of content aggregation. The flowchart 600 starts at 605 which occurs after 350 and ends at 695 after which 370 occurs. The flowchart 500 may be performed by the optimization server 120, and more specifically by the VAST tag combiner 250. The purpose of aggregation is to combine the execution contexts gathered in the parsing process 500 into a unified execution context for the optimized VAST response (e.g., see flow 107). FIG. 6 shows two parallel sub-processes which form the optimized VAST tag: aggregation of media files 610 into an optimized media file and aggregation of metadata 650 into an optimized metadata object.

To form the optimized media file 610, the optimization server retrieves from its cache (e.g., in memory 260) the media files identified in the execution contexts gained from parsing the initial VAST request (FIG. 5). The media files are merged to form the optimized media file and may be stored in a database in memory 260 in the optimization server. The optimized media file may be of a designated format, such as MP4. The optimization server may designate a format based upon the capabilities of the video player, such as of device 110. If the source media files are not in the designated format, they may be transcoded into the designated format by the optimization server. The aggregated media file may include cached creatives, an impression start pixel, a first quartile, a second quartile, a third quartile, and a fourth quartile/ad end pixels. These pixels are fired by the player at key ad playback events, most notably the ad start and every 25% of additional play, so that if the ad plays in full, the start, first, second, third and end quartile events are fired to enable tracking systems to monitor the ad progress.

To aggregate metadata 650, the optimization server retrieves from its cache the metadata of the execution contexts gained from parsing the initial VAST request (FIG. 5). The metadata may include categorization of the ad. Categorization may be performed by the optimization server, for example as part of parsing or as part of aggregation. The categorization data, which may be stored in the database, may include category (e.g., online shopping, automotive), raw duration, bit rate, and click-through URI. Raw duration is a measure of the time length of the ad. It is possible for duration data provided with an ad to be incorrect, so by determining the actual (i.e., raw) duration the optimization server can ensure that the components of the aggregated media file run in good sequence, without gaps or overlaps, and that the optimized metadata includes accurate duration information. In particular, many ads are marked as being 15 seconds or 30 seconds long, when their actual length could be 13.2 seconds or 39 seconds. The aggregated metadata may include VPAID wrapper client-side executions, isolated client-side auction XML monitored and recorded, and click trackers.

The optimized media file and the optimized metadata object are then inserted into an optimized VAST response, which is sent to the video player of the end user (690).

Referring now to FIG. 8 there is shown a flowchart 800 of processing a VPAID ad unit. The flowchart 800 may be performed by the optimization server 120, and more specifically by the VPAID processor 230. In this process 800, the VPAID processor 230 looks for VPAID ad units that can be processed and turns them into final video ad content. Both JavaScript and Flash VPAID ad units are supported.

The processing shown in FIG. 8 may be performed in the process of FIG. 5 where the initial VAST response is a VPAID creative 570, a VPAID wrapper 580 or a VPAID client-side auction 585 (FIG. 5). The processing shown in FIG. 8 may be performed in contexts in which VAST is supported but not VPAID, such as OTT and SSAI.

In step 810, the VPAID ad unit is received (e.g., as part of a VAST response), a sandbox is created for processing the VPAID ad unit, and ad execution is initialized. The sandbox is created using information about the video player and its environment, which may be derived from the VAST response. This information includes an identification of the video player, and a device ID of a user's device which is running the video player. If the VAST response lacks requisite information for the optimization server to create the sandbox, which is typical for SSAI, the caller or invoker of the optimization server may pass those variables to the optimization server. This may be done through an API or a call-response mechanism.

The sandbox, once created, may be temporary or persistent. If temporary, when processing is complete (step 895) the sandbox is decommissioned. If persistent, the sandbox may be used for later processing of VPAID ad units for the same video player and device ID. Where persistence is desired, the sandbox may be maintained after processing is complete, or may be archived by storing its configuration and state for later revival and use.

Initialization may include loading linear and nonlinear VPAID ad units in a VAST context using the VPAID initAd( ) method.

In step 820, VPAID elements and other scripts are run, including verification and measurement code (MOAT, IAS, etc.) as may be required. These scripts may use one or more variables, such as cookie, IP address, device ID, which provide identification of the user's video player.

In step 830, pools tied to the user's video player (e.g., via cookie, IP address, device ID) may be set up.

In step 840, the ad chain is executed until the actual video payload is reached. The ad chain may include a series and/or nestings of VAST and/or VPAID calls, each of which is processed to get to the actual ad payload. Because the ad chain is run in the sandbox, cookies may be constructed, honor frequency may be capped and pre-bid checks and client-side auctions may be executed, each in a legitimate manner. This also allows device ID to be mapped to the user's cookie, if needed. Execution continues until the actual ad payload is found and the ad is ready to be initialized.

The VPAID processor 230 processes every VPAID ad unit unless it is already marked as unprocessable. The latter may be done by the VPAID processor 230 itself when it detects an exceptional VPAID case. One exceptional case is a VPAID shim unit that does ad management on its own and can deliver different ad content for different users at different times. A VPAID shim is a wrapper that effectively does nothing other than wrap another VAST document.

Then, in step 850, a simple VAST creative (i.e., the actual video payload comprising a media file and corresponding VAST pixels) is returned. The simple VAST creative is configured so that it can be stitched into a SSAI environment or run on an OTT device, along with the VAST elements for firing impression trackers, quartile trackers and so forth for the ad. Items that relate to playback of linear creatives themselves (e.g., standard VAST with a video file) are handled by the video player of the user device.

Rather than returning the tag containing no ad back to the video player to make another round trip to a server, the VPAID processor 230 can call these services server-to-server, passing in all information those platforms need to make their determination as to what ad to respond with. In this case the server the VPAID processor 230 is calling needs to properly retrieve required data from the request the VPAID processor 230 sends it, such as forwarded client IP address, any cookies, tokens, and information on player size, viewability, anti-fraud, URL, etc. Having this information collected once by the VPAID processor 230 and distributed to all servers in the chain who need can save lots of time, round trips and duplicative processing.

As a result, the VPAID processor 230 provides the necessary signals and execution environment in order to satisfy demand requirements and translate these requirements in an OTT/CTV environment, enabling the full range of programmatic demand to run within an OTT or SSAI environment.

The optimization server 120 is well suited to enable delivery of ads to OTT video players, especially those that lack verification support akin to those in desktop video players. Referring now to FIG. 9, there is shown a general system block diagram of an OTT environment 900. The environment 900 is similar to the environment 100 of FIG. 1, and includes the optimization server 120 and a user device 910 which is representative of a number of similar OTT user devices. The user device 910 may be the same as the user device 110 (FIG. 1), but with an OTT video player, but is commonly a smart TV or a TV enhanced with an OTT hardware device. The optimization server of FIG. 9 may be the same as the optimization server of FIG. 1, and therefore only additional capabilities of the optimization server 120 for the OTT environment 900 are now described. The user device 910 has an OTT video player 915. The environment 900 also includes a streaming server 950.

In flow 901, the OTT video player 915 requests a specific video stream from the streaming server 950. The OTT video player 915 may include in the request an identifier of the video stream the user wants to see. In the request, the OTT video player 915 may send additional parameters along with or in conjunction with the stream request, such as the type of client device, an identifier of the OTT video player 915, an identifier of the user device 910, and/or an identifier of the respective user. In the request, the OTT video player 915 may also provide a SYN to the streaming server 950.

The streaming server 950 then fetches the requested video stream and prepares it for streaming to the OTT video player 915 as a served stream (flow 904). The served stream may be a combination of content and/or ads. These stream components may be in any particular order and combination, and may include repetitions. For example, it could be "1 m30 s ad pod, then content, split every 8 minutes with 1 m30 s ad pods inserted, and when done, run a 3 minute ad pod, and then stream another piece of content".

To prepare the served stream, the streaming server 950 needs to fetch ads. Ad fetching is accomplished by the streaming server 950 sending an initial request, which may be VAST, to the optimization server 120 (flow 902). The request may include the IP address of the user device 910, the SYN received by the streaming server 950 from the OTT video player 915, a "stream ID" used by the streaming server 950 to identify the served stream it is preparing, the user agent, and other information.

The optimization server 120 then processes the request as explained herein. Processing the request may include serving digital video ads using the VPAID processor 230 creating a sandbox environment for processing a VPAID ad unit as a virtualized environment of the video player 915. Accordingly, the optimization server 120 uses the data received from the streaming server 950 and creates an environment to mimic all of these characteristics such that any JavaScript code executing in the instance of this specific environment will have all the characteristics of the OTT video player 951 as if the code were executing on it directly. The environment or the result of the environment may be sent to the streaming server 950 in a media file (flow 903). That file may be executed and sent as stream by streaming server 950 to player 915 (flow 904). For example, in the environment, the optimization server 120 executes any script that came packaged with the ad as it would have on the device. The optimization server 120 may optimize and cache the VAST document for faster execution.

In the environment, the optimization server 120 not only fetches the ad of request 902 for the streaming server 950, the optimization server 120 also runs the ad in the virtualization of the OTT video player 915 in synchronization with the real OTT video player 915 (flows 903 and 904). The optimization server 120 therefore may determine exactly which ad is running along with all of the tracking pixels from the entire stack of vendors in use—measurement vendors, programmatic vendors, nested programmatic vendors, rich media vendors. The optimization server 120 may allow firing of pixels based on stream positioning, which can be used for verification. Even in situations where the video ad lacks pixel firing, the optimization server 120, through the virtualized environment, may support verification through real time stream updates or a post-facto server log. The optimization server 120 emulates, in the environment, the appropriate size, IP and device information, through parameter and header substitution, and constructs cache buster, transaction ID, and other tracking IDs that may be needed for the ad vendors and that are not created by the streaming server 950.

In flow 903, the optimization server 120 returns to the streaming server 950 a media file to stitch into the served stream (e.g., of flow 904). The streaming server 950 stitches the video ads returned by the optimization server 120 into the served stream.

In flow 904, streaming server 950 streams the served stream (of the file received in flow 903) to the OTT video player 915. In flow 905, during playout, the streaming server 950 may send periodic heartbeats, such as every second, to the optimization server 120. These heartbeats may include a time period, such as the number of seconds, of the ad that it has streamed. The optimization server 120 may use the heartbeat information from to call associated events such as quartile events and video completed appropriately.

The OTT video player 915 may include interface code which sends data to the optimization server 120 during the playback of video streams (flow 906). The data flow 906 may include a heartbeat, akin to that in flow 905 or in lieu of flow 905. The flow 906 heartbeat may include video window size, location, z order, overlapping rectangles, and other information about the viewability of the OTT video player 915 on the actual screen of the user device 910. The interface code in the OTT video player 915 may send the stream ID, device advertising ID, IP address and "playhead position" (i.e., the number of seconds into the stream that have been played) to the optimization server 120. The data of flow 906 may be used by the optimization server 120 for the instance of the mimicked environment of the OTT video player 915, so that the virtualized OTT video player in the optimization server 120 environment processes the ad such that the environment has the appropriate geometry needed to calculate viewability.

The optimization server 120, by virtualizing the OTT video player 915, enables typical verification vendors, ad exchanges and ad servers to work as-is in an SSAI/DAI environment, with benefits provided by a desktop video player. This allows verification services to verify the validity of the traffic, the viewability of the ad during playback, the actual playback of the ad, and potentially brand safety. It also allows, JavaScript measurement capabilities that are required for many ad buyers. That is, the optimization server 120 has the information and execution capabilities needed to faithfully recreate an environment that simulates code execution on the user device 910.

Figure 7:
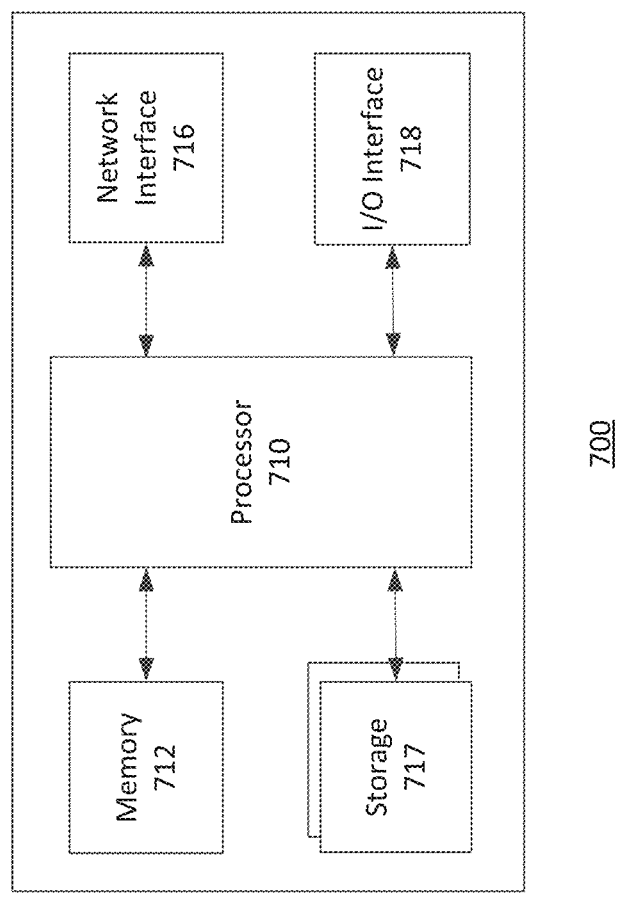
FIG. 7 is a block diagram of a computing device.

Referring now to FIG. 7 there is shown a block diagram of a computing device 700. The computing device 700 may be representative of the devices shown in FIG. 1—the user device 110, the optimization server 120, the primary ad server 130 and the secondary ad server 140. The computing device 700 may be a desktop or laptop computer, a server computer, a client computer, a network router, a network node, a tablet, a smartphone or other mobile device. The computing device 700 may include software and/or hardware for providing functionality and features described herein. The computing device 700 may therefore include one or more of: logic arrays, memories, analog circuits, digital circuits, software, firmware and processors. The hardware and firmware components of the computing device 700 may include various specialized units, circuits, software and interfaces for providing the functionality and features described herein. For example, a system of two physical network objects may provide continual automated discovering of the topology information of network objects for a selected executing application.

The computing device 700 has a processor 710 coupled to a memory 712, storage 717, a network interface 716 and an I/O interface 718. The processor 710 may be or include one or more microprocessors, field programmable gate arrays (FPGAs), application specific integrated circuits (ASICs), programmable logic devices (PLDs) and programmable logic arrays (PLAs).

The memory 712 may be or include RAM, ROM, DRAM, SRAM and MRAM, and may include firmware, such as static data or fixed instructions, BIOS, system functions, configuration data, and other routines used during the operation of the computing device 700 and processor 710. The memory 712 also provides a storage area for data and instructions associated with applications and data handled by the processor 710. As used herein the term "memory" corresponds to the memory 712 and explicitly excludes transitory media such as signals or waveforms.

The storage 717 provides non-volatile, bulk or long-term storage of data or instructions in the computing device 700. The storage 717 may take the form of a magnetic or solid state disk, tape, CD, DVD, or other reasonably high capacity addressable or serial storage medium. Multiple storage devices may be provided or available to the computing device 500. Some of these storage devices may be external to the computing device 700, such as network storage or cloud-based storage. As used herein, the terms "storage" and "storage medium" correspond to the storage 717 and explicitly exclude transitory media such as signals or waveforms. In some cases, such as those involving solid state memory devices, the memory 712 and storage 717 may be a single device.

The network interface 716 includes an interface to a network such as a network that can be used to communicate calls, signals, streams, arrays, flagged samples and feedback described herein. The network interface 716 may be wired or wireless.

The I/O interface 718 interfaces the processor 710 to peripherals (not shown) such as displays, video and still cameras, microphones, keyboards and USB devices.

In some cases, storage 717 is a non-volatile machine-readable storage medium that includes all types of computer readable media, including magnetic storage media, optical storage media, and solid state storage media. The software can be installed in and sold with the optimization server 120. Alternatively, the software can be obtained and loaded into the optimization server 120, including obtaining the software via a disc medium or from any manner of network or distribution system, including from a server owned by the software creator or from a server not owned but used by the software creator. The software can be stored on a server for distribution over the Internet.

The technologies described herein provide various technological improvements to computer performance and efficiently. For example, the system 100, the optimization server 120, the process 300, and/or the computing device 700 more quickly and efficiently render and/or execute video ads.

The optimization server 120 may include separate units (not ad units) corresponding to each of the functional blocks in FIG. 3. These units may be hardware, software, firmware, or a combination thereof. Additional and fewer units, modules or other arrangement of software, hardware and data structures may be used to achieve the processes and apparatuses described herein.

Within this description, the term unit also means a collection of hardware, firmware, and/or software, which may be on a larger scale than an engine. For example, a unit may contain multiple engines, some of which may perform similar functions in parallel. The terms engine and unit do not imply any physical separation or demarcation. All or portions of one or more units and/or engines may be collocated on a common card, such as a network card 516, or within a common FPGA, ASIC, or other circuit device.

The techniques may be implemented with machine readable storage media in a storage device included with or otherwise coupled or attached to a computing device. That is, the software may be stored in electronic, machine readable media. These storage media include magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

Closing Comments

Throughout this description, the technologies described and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one technology are not intended to be excluded from a similar role in other technologies.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method of serving digital video ads comprising:
   a VAST processor creating a sandbox for processing a VAST ad unit as a virtualized environment of a video player, the VAST ad unit including plural elements;
   the VAST processor running the VAST elements in the sandbox as an emulation of the video player;
   the VAST processor running the ad chain until a video payload is reached;
   the VAST processor returning a VAST creative comprising the video payload.

2. The method of serving digital video ads of claim 1 wherein the video player is a software application on a user device which plays video ads automatically.

3. The method of serving digital video ads of claim 1 wherein the video player sends a single VAST request to the optimization server and the VAST processor responds with a single VAST response.

4. The method of serving digital video ads of claim 1 including determining an actual duration of the unified ad, and the optimized response specifies the actual duration.

5. The method of serving digital video ads of claim 1 wherein if the VAST processor determines that the first VAST tag is a VAST creative, a VAST wrapper or a VAST client-side auction, then the optimization server parsing the first VAST tag and combining all of the ads implicated in the VAST creative, the VAST wrapper or the VAST client-side auction.

6. The method of serving digital video ads of claim 1 including running the video payload in the sandbox in synchronization with the video player running the video payload.

7. The method of serving digital video ads of claim 1 including monitoring an amount of time spent by the optimization server unpacking the first VAST tag on behalf of the video player and creating the optimized response, and skipping some processing specified in the first VAST tag if the amount of time exceeds a predetermined period of time.

8. The method of serving digital video ads of claim 1 including running the video payload in the sandbox and firing tracking pixels in the video payload.

9. The method of serving digital video ads of claim 1 wherein the sandbox emulates a screen size, IP address and device information of the video player.

10. The method of serving digital video ads of claim 6, wherein the optimization server provides verification data of the video payload running in the sandbox.

11. An apparatus comprising an optimization server comprising a non-volatile machine-readable medium storing a program having instructions which when executed by a processor will cause the processor to serve a digital video ad, the optimization server including a VAST processor, the instructions of the program for:
- the VAST processor creating a sandbox for processing a VAST ad unit as a virtualized environment of a video player, the VAST ad unit including plural elements;
- the VAST processor running the VAST elements in the sandbox as an emulation of the video player;
- the VAST processor running the ad chain until a video payload is reached;
- the VAST processor returning a VAST creative comprising the video payload.

12. The apparatus of claim 11 wherein the video player is a software application on a user device which plays video ads automatically.

13. The apparatus of claim 11 wherein the video player sends a single VAST request to the optimization server and the VAST processor responds with a single VAST response.

14. The apparatus of claim 11, the instructions of the program further for determining an actual duration of the unified ad, and the optimized response specifies the actual duration.

15. The apparatus of claim 11, the instructions of the program further for, the VAST processor determining whether the first VAST tag is a VAST creative, a VAST wrapper or a VAST client-side auction, and if so then parsing the first VAST tag and combining all of the ads implicated in the VAST creative, the VAST wrapper or the VAST client-side auction.

16. The apparatus of claim 11, the instructions of the program further for running the video payload in the sandbox in synchronization with the video player running the video payload.

17. The apparatus of claim 11, the instructions of the program further for monitoring an amount of time spent by the optimization server unpacking the first VAST tag on behalf of the video player and creating the optimized response, and skipping some processing specified in the first VAST tag if the amount of time exceeds a predetermined period of time.

18. The apparatus of claim 11, the instructions of the program further for running the video payload in the sandbox and firing tracking pixels in the video payload.

19. The apparatus of claim 11 wherein the sandbox emulates a screen size, IP address and device information of the video player.

20. The apparatus of claim 16, wherein the optimization server provides verification data of the video payload running in the sandbox.

* * * * *